United States Patent
Jang

(10) Patent No.: US 9,070,326 B2
(45) Date of Patent: Jun. 30, 2015

(54) BACKLIGHT UNIT AND METHOD FOR DRIVING THE SAME

(75) Inventor: Hoon Jang, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 104 days.

(21) Appl. No.: 13/485,396

(22) Filed: May 31, 2012

(65) Prior Publication Data

US 2012/0306388 A1 Dec. 6, 2012

(30) Foreign Application Priority Data

Jun. 3, 2011 (KR) .................. 10-2011-0054127
Apr. 30, 2012 (KR) .................. 10-2012-0045271

(51) Int. Cl.
| | | |
|---|---|---|
| H05B 37/02 | (2006.01) | |
| G09G 3/34 | (2006.01) | |
| H02M 3/156 | (2006.01) | |
| H05B 33/08 | (2006.01) | |

(52) U.S. Cl.
CPC ............. *G09G 3/3406* (2013.01); *H02M 3/156* (2013.01); *H05B 33/0815* (2013.01); *H05B 33/0818* (2013.01); *G09G 2320/064* (2013.01)

(58) Field of Classification Search
CPC .................................................. H05B 33/0809
USPC .............. 315/186, 307, 308, 291, 224, 185 R
See application file for complete search history.

(56) References Cited

U.S. PATENT DOCUMENTS

| | | | | |
|---|---|---|---|---|
| 8,054,008 | B2* | 11/2011 | Kimura | .................. 315/307 |
| 2006/0290298 | A1 | 12/2006 | Kang et al. | |
| 2008/0150436 | A1 | 6/2008 | Suzuki | |
| 2008/0297128 | A1* | 12/2008 | Xu et al. | ................... 323/282 |
| 2010/0225622 | A1* | 9/2010 | Wang et al. | ................... 345/204 |
| 2010/0259177 | A1* | 10/2010 | Mednik et al. | ............ 315/185 R |
| 2010/0289424 | A1* | 11/2010 | Chang et al. | .................. 315/250 |
| 2010/0327772 | A1 | 12/2010 | Lee et al. | |
| 2011/0254469 | A1* | 10/2011 | Ruan et al. | ................... 315/307 |

FOREIGN PATENT DOCUMENTS

| | | | |
|---|---|---|---|
| CN | 1012707329 | A | 6/2008 |
| CN | 101438386 | A | 5/2009 |
| EP | 2 017 814 | A2 | 1/2009 |
| JP | 2008-53629 | A | 3/2008 |

(Continued)

OTHER PUBLICATIONS

The Logic and Function, Mar. 9, 2010, Electronics Tutorials.*

*Primary Examiner* — David H Vu
(74) *Attorney, Agent, or Firm* — Birch, Stewart, Kolasch & Birch, LLP

(57) ABSTRACT

A backlight unit according to one embodiment includes an LED array having a plurality of LEDs; a voltage generating unit for generating a driving voltage to drive the plurality of LEDs in response to a switching signal; an amplifying unit for feeding the driving voltage back and amplifying the fed driving voltage, to output an amplification signal; a stabilizer for stabilizing the amplification signal; a comparator for comparing the amplification signal with a reference waveform to apply the switching signal to the voltage generating unit; a first switching unit for switching a current of the LED array in response to a PWM dimming signal from a timing controller; and a second switching unit for switching the switching signal from the comparator in response to the PWM dimming signal.

20 Claims, 6 Drawing Sheets

(56) References Cited

FOREIGN PATENT DOCUMENTS

| | | |
|---|---|---|
| JP | 2008/288207 A | 11/2008 |
| KR | 10-0628721 B1 | 9/2008 |
| KR | 10-094150 B1 | 2/2010 |
| TW | M359770 U1 | 6/2009 |
| TW | 201008389 A | 2/2010 |
| TW | 201025247 A | 7/2010 |
| TW | 201033690 A1 | 9/2010 |

* cited by examiner

BACKLIGHT UNIT AND METHOD FOR DRIVING THE SAME

CROSS REFERENCE TO RELATED APPLICATION

This application claims the priority benefit of the Korean Patent Application No. 10-2011-0054127 filed on Jun. 3, 2011, and the Korean Patent Application No. 10-2012-0045271 filed on Apr. 30, 2012, which are hereby incorporated by reference as if fully set forth herein.

BACKGROUND OF THE DISCLOSURE

1. Field of the Disclosure

The present invention relates to a backlight unit in which an LED driving voltage is stabilized, and a method for driving the same.

2. Discussion of the Related Art

In general, a liquid crystal display device displays a picture by controlling light transmissivity of liquid crystals having dielectric anisotropy by using an electric field. To do this, the liquid crystal display device is provided with a liquid crystal panel having a liquid crystal cell matrix, a driving circuit for driving the liquid crystal panel, and a backlight unit for directing a light to the liquid crystal panel.

Recently, as the backlight unit, an LED backlight unit which uses a light emitting diode LED as a light source is spot lighted, which has advantages of high brightness and low power consumption in comparison to the present lamp.

A related art LED backlight unit is provided with a plurality of LED arrays, a voltage generating unit for generating a driving voltage to drive the plurality of LED arrays, a feedback circuit for feeding the driving voltage back to the voltage generating unit for stabilizing the driving voltage, and a dimming control unit for controlling a current to the LED arrays in response to a dimming signal from a timing controller to control brightness of the light.

In the meantime, the dimming signal is a pulse width modulation signal having a predetermined duty value. However, there has been a problem in that a switching delay of the feedback circuit causes a ripple in which the driving voltage drops slightly at the time the dimming signal rises from a low state to a high state. Such a ripple of the driving voltage affects the LED driving current, to cause defect of the brightness.

SUMMARY OF THE DISCLOSURE

Accordingly, the present invention is directed to a backlight unit, and a method for driving the same.

An object of the present invention is to provide a backlight unit in which an LED driving voltage is stabilized, and a method for driving the same.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a backlight unit includes an LED array having a plurality of LEDs; a voltage generating unit for generating a driving voltage to drive the plurality of LEDs in response to a switching signal; an amplifying unit for feeding the driving voltage back and amplifying the fed driving voltage, to output an amplification signal; a stabilizer for stabilizing the amplification signal; a comparator for comparing the amplification signal with a reference waveform to apply the switching signal to the voltage generating unit; a first switching unit for switching a current of the LED array in response to a PWM dimming signal from a timing controller; and a second switching unit for switching the switching signal from the comparator in response to the PWM dimming signal.

The backlight unit further includes a third switching unit for switching between the amplifying unit and the stabilizer in response to the PWM dimming signal.

Further, a backlight unit includes an LED array having a plurality of LEDs; a voltage generating unit for generating a driving voltage to drive the plurality of LEDs in response to a switching signal; an amplifying unit for feeding the driving voltage back and amplifying the fed driving voltage, to output an amplification signal; a stabilizer for stabilizing the amplification signal; a comparator for comparing the amplification signal with a reference waveform to apply the switching signal to the voltage generating unit; a first switching unit for switching a current of the LED array in response to a PWM dimming signal from a timing controller; and a second switching unit for switching between the amplifying unit and the stabilizer in response to the PWM dimming signal.

The first to third switching units are turned on in a high period of the PWM dimming signal, and are turned off in a low period of the PWM dimming signal.

The reference waveform has a triangular waveform.

A method for driving a backlight unit includes generating a driving voltage to drive an LED array in response to a switching signal; distributing and feeding the driving voltage back, and amplifying the fed driving voltage to generate an amplification signal; stabilizing the amplification signal; controlling a current of the LED array in response to a PWM dimming signal; comparing the amplification signal with a reference waveform to generate the switching signal; and switching the switching signal in response to the PWM dimming signal.

Further, a method for driving a backlight unit includes generating a driving voltage to drive an LED array in response to a switching signal; distributing and feeding the driving voltage back, and amplifying the fed driving voltage to generate an amplification signal; stabilizing the amplification signal; controlling a current of the LED array in response to a PWM dimming signal; comparing the amplification signal with a reference waveform to generate the switching signal; and switching the amplification signal not to stabilize the amplification signal in response to the PWM dimming signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Hereinafter, the embodiments of the backlight unit of the present invention and the method for driving the backlight unit will be described in detail, with referring to the attached drawings.

In the meantime, the backlight unit in accordance with an embodiment of the present invention has an LED applied thereto as a light source for directing a light to a liquid crystal panel. In the backlight unit, though there are a direct lighting type and an edge lighting type depending on a position of the light source, the present invention is not limited to this.

Figure 1:
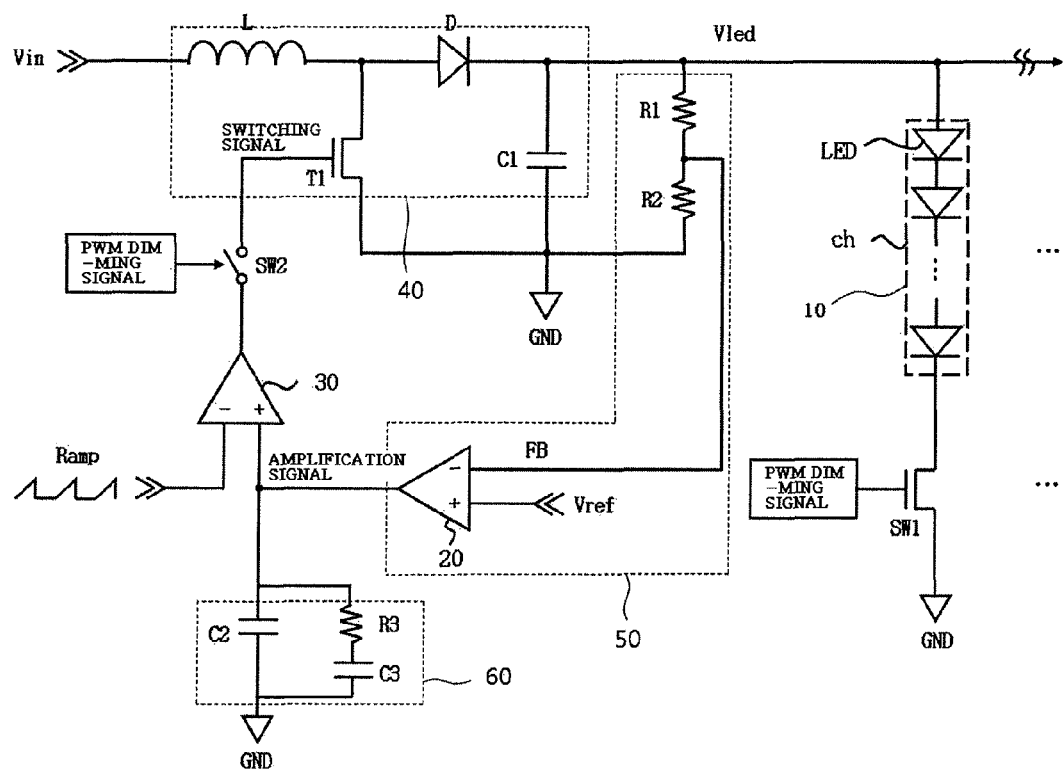
FIG. 1 illustrates a circuit diagram of a backlight unit in accordance with an embodiment of the present invention.

FIG. 1 illustrates a circuit diagram of a backlight unit in accordance with an embodiment of the present invention.

Referring to FIG. 1, the backlight unit includes an LED array 10 divided into a plurality of channels ch, each channel having a plurality of LEDs, a voltage generating unit for generating a driving voltage Vled for driving the plurality of LEDs in response to a switching signal, an amplifying unit 50 for distributing the driving voltage Vled, generate a feedback voltage FB, differential-amplifying the feedback voltage FE to generate an amplification signal, a stabilizer 60 for stabilizing the amplification signal output from the amplifying unit 50, a comparator 30 for comparing the amplification signal output from the amplifying unit 50 with a reference signal (a triangular waveform signal) to control a current of an LED array by switching a first switching device T1 of the voltage generating unit 40, a first switching unit SW1 for switching the current of the LED array 10 in response to a PWM dimming signal output from a timing controller (not shown), and a second switching unit SW2 for switching the switching signal output from the comparator 30 in response to the PWM dimming signal output from the timing controller.

Although not shown in drawings, a sensing resistor for sensing a current may be included between the first switching device T1 and the ground GND.

The LED array 10 includes a plurality of channels ch, each channel having at least two LEDs connected in series. Though FIG. 1 illustrates one channel, the number of the channels ch included in the LED array is not limited. The LEDs are configured to emit a white light to the liquid crystal panel. However, depending on cases, the LEDs may be configured to emit any one of R, G, and B light.

The voltage generating unit 40 includes an inductor L, a first switching device T1, a diode D, and a first capacitor C1. The voltage generating unit 40 generates a DC(Direct Current) voltage by resonance of the inductor L, the diode D, and the first capacitor C1. Namely, the first switching device T1 is switched in response to the duty cycle of a switching signal output from the comparator 30, to transform an input voltage Vin into the DC driving voltage Vled having a constant level, and to supply the converted driving voltage Vled to the LED array 10. In the meantime, the diode D prevents the current supplied to the LED array from flowing in a reverse direction, and the first capacitor C1 stabilizes the driving voltage Vled. The amplifying unit distributes the driving voltage Vled according to a resistance ratio of the first and second resistors R1 and R2 to generate the feedback voltage FB. In this instance, the feedback voltage FB is supplied to the differential amplifier 20. The differential amplifier 20 amplifies a difference between the feedback voltage FB and the reference voltage Vref, and outputs the amplified difference. To do this, the differential amplifier 20 has an inversion input terminal receiving the feedback voltage FB, and a non-inversion input terminal for receiving the reference voltage Vref. Namely, the amplifying unit 50 outputs a signal having high potential in case the difference between the feedback voltage FB and the reference voltage Vref becomes higher, and a signal having low potential in case the difference becomes lower.

The comparator 30 compares the amplification signal output from the differential amplifier 20 with a reference waveform Ramp to generate the switching signal. To do this, the comparator 30 has an inversion input terminal for receiving the reference waveform Ramp, and a non-inversion input terminal for receiving the amplification signal output from the differential amplifier 20. Though, in the embodiment, the reference waveform Ramp has a triangular waveform, but is not limited to this.

In the meantime, the switching signal output from the comparator 30 is a PWM signal having a predetermined duty value. In detail, the switching signal varies with the comparing operation of the comparator 30 as follows.

That is, if the amplification signal output from the differential amplifier 20 has potential higher than that of the reference waveform Ramp, the comparator 30 outputs the switching signal having high level. If the amplification signal output from the differential amplifier 20 has potential lower than the reference waveform Ramp, the comparator 30 outputs the switching signal having low level. Here, if the time during which the amplification signal output from the differential amplifier 20 has potential higher than that of the reference waveform Ramp becomes longer, the duty cycle of the switching signal increases. However, if the time during which the amplification signal output from the differential amplifier 20 has potential higher than that of the reference waveform Ramp decreases, the duty cycle of the switching signal becomes small.

Thus, the voltage generating unit 40 maintains the driving voltage Vled constant by using the switching signal having the varied duty cycle.

As described before, the amplifying unit 50 serves to maintain the driving voltage Vled to be constant by using the feedback voltage FB.

In case the backlight unit of FIG. 1 does not include the second switching unit SW2, the following drawback may occur.

Namely, a PWM dimming signal supplied from the timing controller repeats a low state and a high state at fixed intervals. In a high period of the PWM dimming signal, the first switching unit SW1 is turned on to generate a driving current for the LED array 10. In a low period of the PWM dimming signal, the first switching unit SW1 is turned off not to generate the driving current for the LED array 10.

According to this, since there is no load on the LED array 10 in the low period of the PWM dimming signal, and due to the delay phenomenon mentioned later, the driving voltage Vled rises at an output terminal of the voltage generating unit 40. If the driving voltage Vled rises thus, the feedback voltage FB also rises, causing the differential amplifier 20 to forward the signal having low potential.

Thus, if the differential amplifier 20 outputs the amplification signal having low potential in the low period of the PWM dimming signal, the capacitor C2 of the stabilizer 60 is discharged.

In the meantime, the delay as the time during which the capacitor C2 is charged takes place because the capacitor C2 discharged in the low period of the PWM dimming signal is charged when as described before the amplifying unit 50 amplifies and outputs the difference between the feedback signal and the reference signal, at the time point the PWM dimming signal rises from the low state to the high state. Thus, the signal output from the differential amplifier 20 is supplied to the comparator 30 late as much as the delay.

The generating of the delay causes the ripple of the driving voltage Vled. This will be described in detail.

Figure 2:
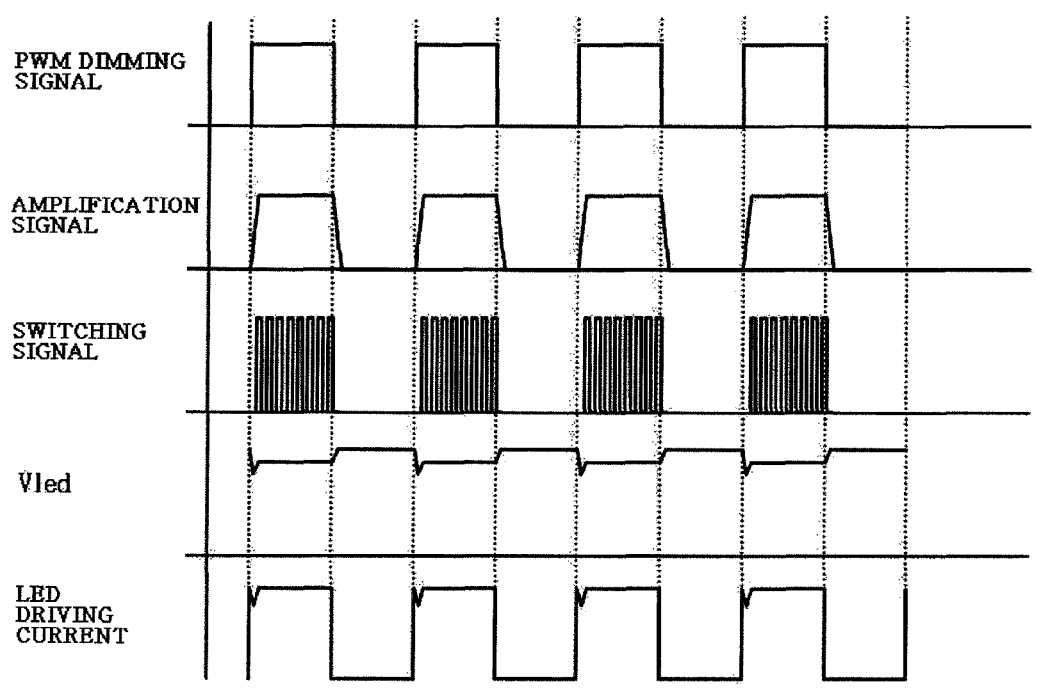
FIG. 2 illustrates waveforms for describing delay taken place at an amplifying unit and a comparator in case the backlight unit of FIG. 1 does not include a second switching unit.

FIG. 2 illustrates waveforms for describing delay taken place at an amplifying unit 50 and a comparator 30 in case the backlight unit of FIG. 1 does not include the second switching unit.

Figure 3:
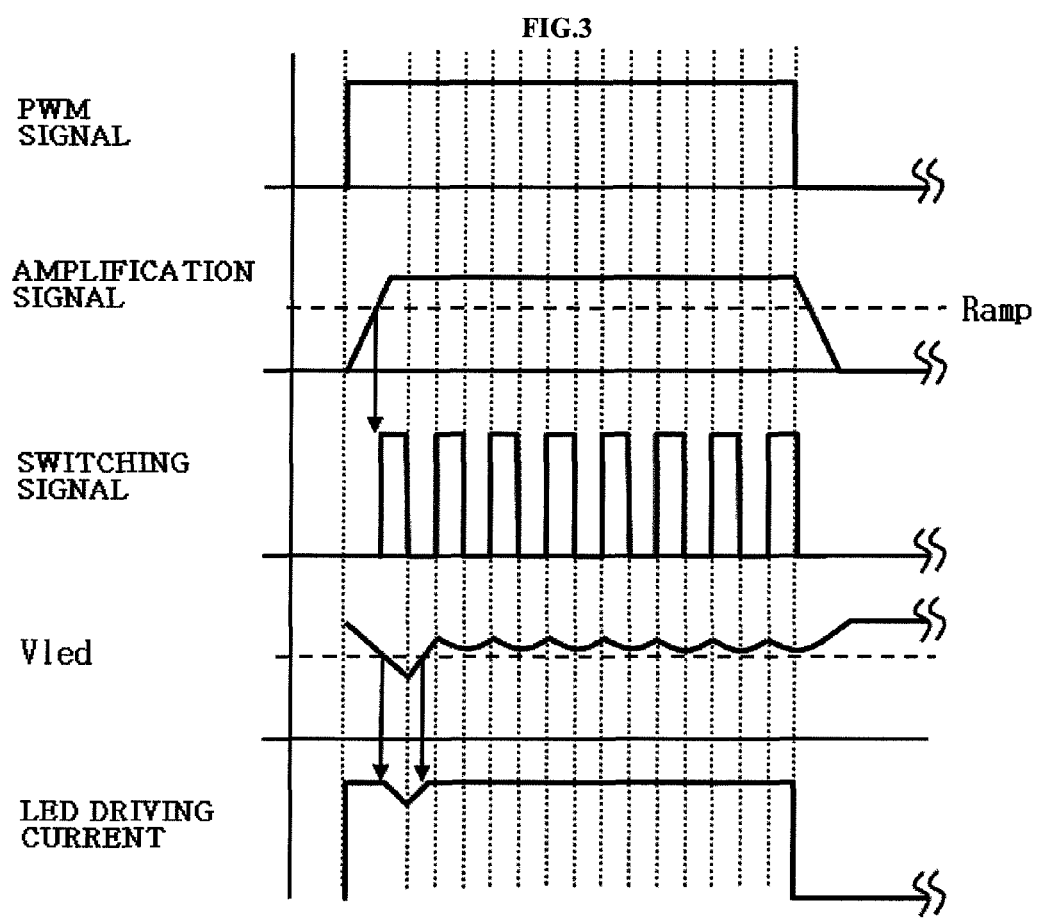
FIG. 3 illustrates waveforms in FIG. 2, enlarged partially.

FIG. 3 illustrates waveforms in FIG. 2, enlarged partially.

Referring to FIG. 2, the first switching unit SW1 controls the current of the LED array 10 in response to the PWM dimming signal supplied from the timing controller. In this instance, the PWM dimming signal is a PWM signal repeating a low state and a high state at fixed intervals. In a high period of the PWM dimming signal, the driving current for the LED array 10 is generated as the first switching unit SW1 is turned on. In a low period of the PWM dimming signal, the driving current for the LED array 10 is not generated as the first switching unit SW1 is turned off.

According to this, since there is no load on the LED array 10 in the low period of the PWM dimming signal and due to the delay phenomenon, the driving voltage Vled rises at an output terminal of the voltage generating unit 40. If the driving voltage Vied rises thus, the feedback voltage FB also rises, causing the differential amplifier 20 to forward the amplification signal having low potential.

Thus, if the differential amplifier 20 outputs the amplification signal having low potential in the low period of the PWM dimming signal, the capacitor C2 of the stabilizer 60 is discharged.

Since the capacitor C2 discharged in the low period the PWM dimming signal is charged when the amplifying unit 50 amplifies and outputs the difference between the feedback signal and the reference signal, at the time point the PWM dimming signal rises from the low state to the high state, the delay takes place as the time in which the capacitor C2 is charged. Thus, the amplification signal output from the differential amplifier 20 is supplied to the comparator 30 late as much as the delay.

The comparator 30 compares the amplification signal output from the amplifying unit 50 with the reference signal (triangular waveform signal, Ramp) to generate a switching signal having duty cycle and to output the switching signal to the first switching device T1 of the voltage generator 40.

As shown in FIG. 3, due to the delay, the switching single output from the comparator 30, when compared with the PWM dimming signal, is delayed as a constant time. Namely, the switching signal is not output at the rising edge of the PWM dimming signal, and is output at the falling edge of the PWM dimming signal.

Thus, since the switching signal is not output though there is a load taken place on the LED array 10 due to the PWM dimming signal in the rising edge of the PWM dimming signal, the driving voltage Vled drops, instantly. Since the switching signal is output though there is no load on the LED array 10 due to the PWM dimming signal in the falling edge of the PWM dimming signal, the driving voltage Vled instantly rises.

For the above reasons, in the rising edge of the PWM dimming signal, the driving voltage Vled forms the ripple having low potential, momentarily. The ripple of the driving voltage Vled affects the LED driving current, resulting in a defect of the brightness.

In order to solve above problem, the embodiment of FIG. 1 suggests providing the second switching unit SW2 connected to an output terminal of the comparator 30. The second switching unit SW2 is configured to be switched in response to the PWM dimming signal.

A method for driving the embodiment of the backlight unit of FIG. 1 having the second switching unit SW2 at the output terminal of the comparator 30 will be described as follows.

Figure 4:
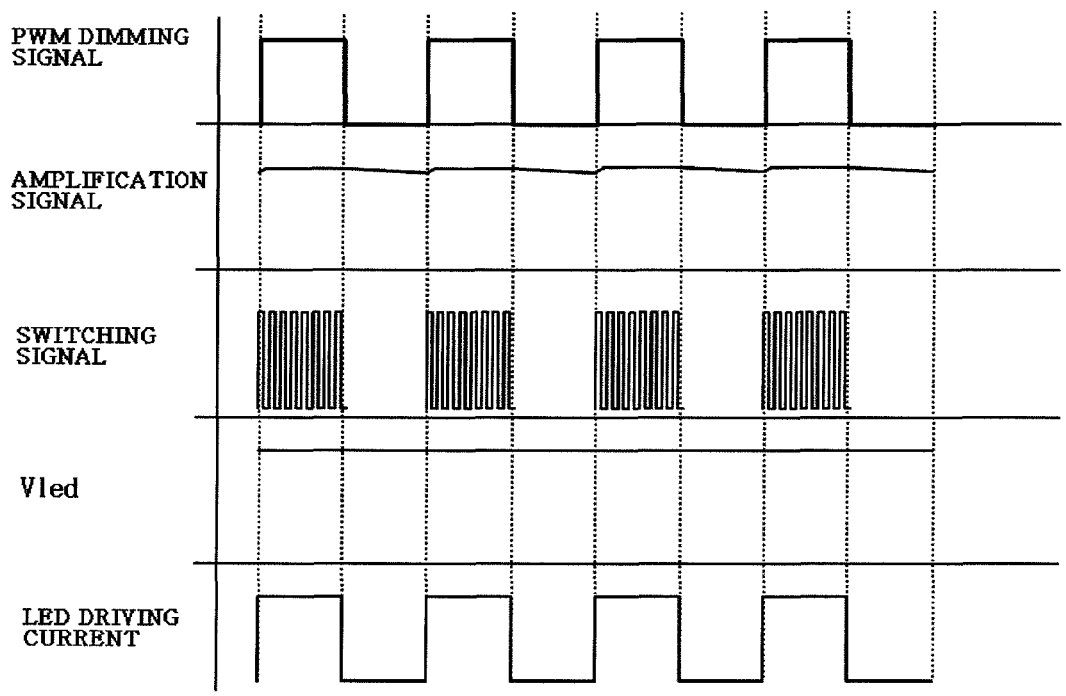
FIG. 4 illustrates driving waveforms of the backlight unit in FIG. 1.

FIG. 4 illustrates driving waveforms of the backlight unit in FIG. 1.

Referring to FIG. 4, the backlight unit according to the embodiment of FIG. 1 of the present invention prevents a delay of forwarding of the switching signal at the time point the PWM dimming signal rises from a low state to a high state, and at the time point the PWM dimming signal rises from a high state to a low state, resulting to maintain the driving voltage Vled constant, enabling to maintain the LED driving current stable.

Namely, as aforementioned with referring to FIGS. 2 and 3, due to the delay, the switching signal output from the comparator 30, when compared with the PWM dimming signal, is delayed as a constant time. In other words, the switching signal is not output at the rising edge of the PWM dimming signal and is output at falling edge of the PWM dimming signal.

However, since the second switching unit SW2 is switched (turned off) by the PWM dimming signal, the switching signal is not output from the comparator 30 to the first switching device Ti of the voltage generator 40. Thus, at the falling edge of the PWM dimming signal, while there is no load on the LED array 10, the rise of the driving voltage Vled by the dealy is prevented.

Thus, since the driving voltage Vled does not instantaneously rise in the low period of the PWM dimming signal, the feedback voltage FB of the amplifying unit 50 does not rise so that the amplifier 20 continuously outputs an amplification signal having high potential.

Accordingly, since the differential amplifier 20 outputs an amplification signal having high potential even in a low period of the PWM dimming signal, the capacitor C2 of the stabilizer 60 is not discharged. Further, as the time point the PWM dimming signal rises from a low state to a high state, it is not necessary to charge the capacitor C2 of the stabilizer 60. Thus, the delay of the amplification signal output from the differential amplifier 20 to the comparator 30 does not occur.

As aforementioned, since the delay does not occur, the switching signal output from the comparator 30 synchronizes with the PWM dimming signal. Namely, the switching signal is output at the rising edge of the PWM dimming signal, and is not output at the falling edge of the PWM dimming signal.

Therefore, a momentary drop of the driving voltage Vled at the rising edge of the PWM dimming signal may be prevented and a momentary rise of the driving voltage Vled at the falling edge of the PWM dimming signal may be prevented. Also, the backlight unit may prevent a ripple of the driving voltage Vled at the rising of the PWM dimming signal, enabling to make stable maintenance of the LED driving current.

And, in FIG. 1, the delay of the switching signal may be reliably prevented even in case the second switching unit SW2 is positioned between the amplifying unit 50 and the stabilizer 60.

This will be described in detail as follows.

Figure 5:
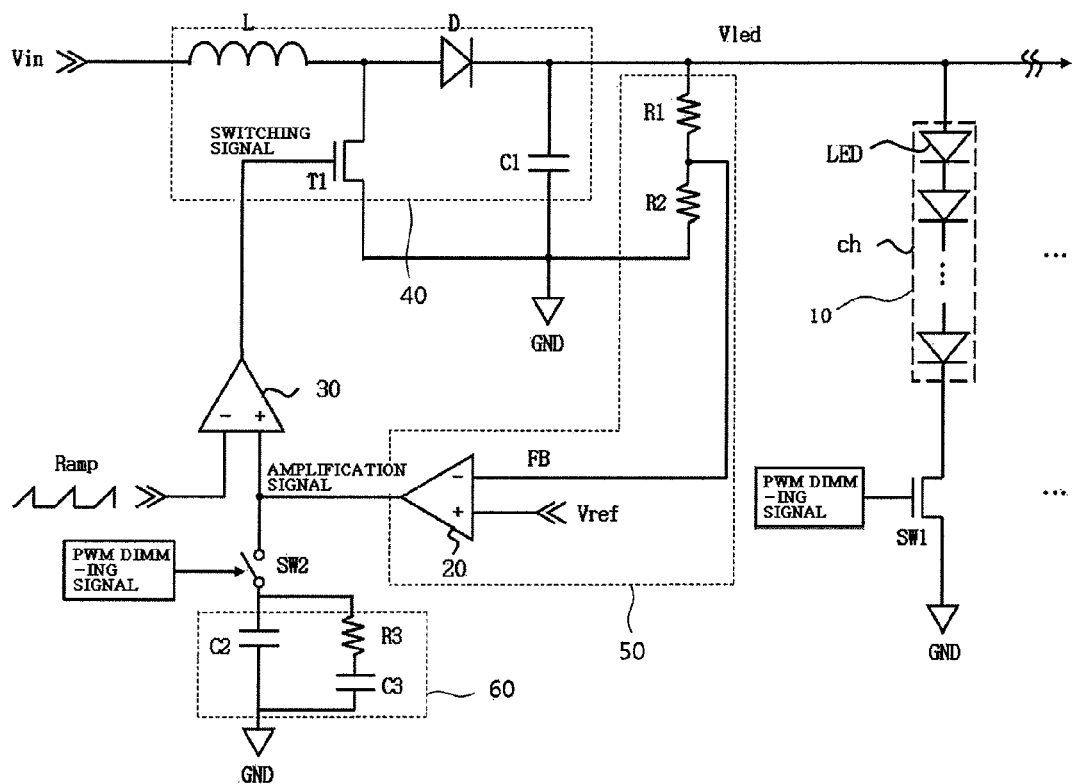
FIG. 5 illustrates a circuit diagram of a backlight unit in accordance with an another embodiment of the present invention.

FIG. 5 illustrates a circuit diagram of a backlight unit in accordance with an another embodiment of the present invention.

The backlight unit of FIG. 5 is similar to that of FIG. 1, except for the second switching unit SW2 positioned between the amplifying unit 50 and the stabilizer 60. The second switching unit SW2 is configured to be switched by the PWM dimming signal.

The operation of the backlight unit of FIG. 5 having the second switching unit SW2 positioned between the amplifying unit 50 and the stabilizer 60 will be described as follows.

As described with referring to FIGS. 2 and 3, since there is no load on the LED array 10 in the low period of the PWM dimming signal, the driving voltage Vled at the output terminal of the voltage generating unit 40 rises so that the capacitor C2 of the stabilizer 60 floats and is not discharged because the second switching unit SW2 is turned off in the low period of the PWM dimming signal even although the differential amplifier 20 outputs an amplification signal having low potential.

And, since it is not necessary to charge the capacitor C2 although the second switching unit SW2 is turned on at the time point the PWM dimming signal rises from a low state to a high state, delay of the signal supplied to the comparator 30 from the differential amplifier 20 does not occur.

Thus, since the delay does not occur, the switching signal output from the comparator 30 synchronizes with the PWM dimming signal. Namely, the switching signal is output at the rising edge of the PWM dimming signal and is not output at the falling edge of the PWM dimming signal.

A momentary drop of the driving voltage Vled at the rising edge of the PWM dimming signal may be prevented and a momentary rise of the driving voltage Vled at the falling edge of the PWM dimming signal may be prevented. Also, the backlight unit may prevent a ripple of the driving voltage Vled at the rising of the PWM dimming signal, enabling to make stable maintenance of the LED driving current.

And, in FIG. 1, the delay of the switching signal may be reliably prevented in case the third switching unit SW3 is further included between the amplifying unit 50 and the stabilizer 60.

This will be described in detail as follows.

Figure 6:
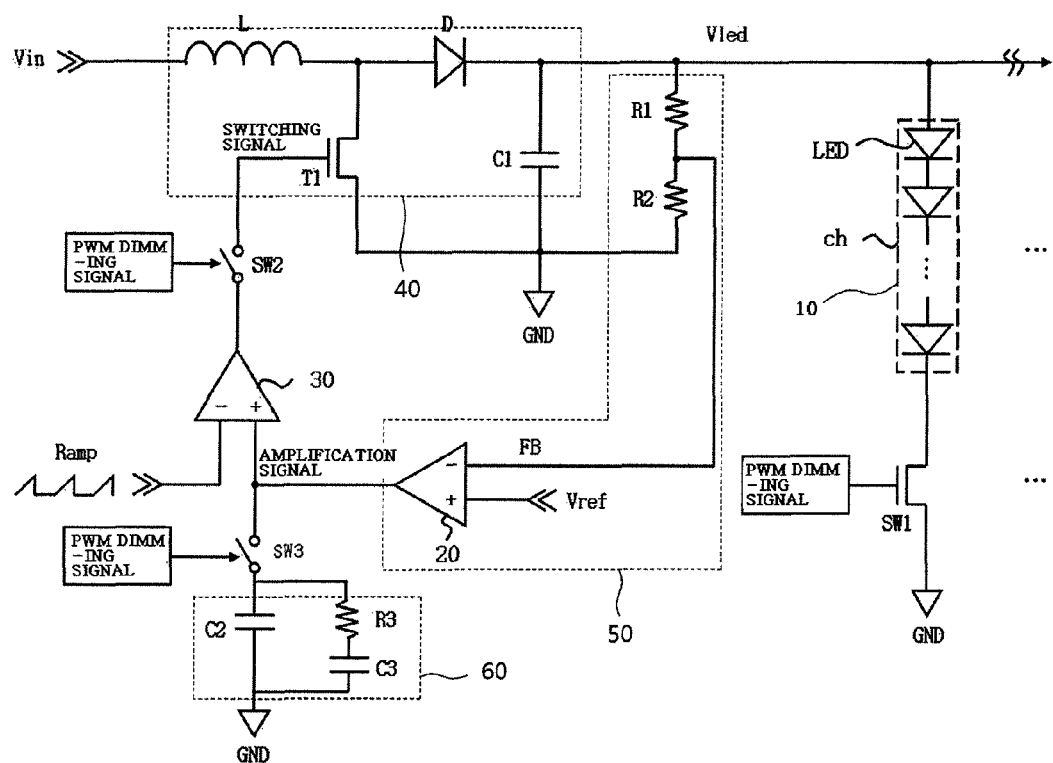
FIG. 6 illustrates a circuit diagram of a backlight unit in accordance with a still another embodiment of the present invention.

FIG. 6 illustrates a circuit diagram of a backlight unit in accordance with a still another embodiment of the present invention.

The backlight unit of FIG. 6 is similar to that of FIG. 1, except for the third switching unit SW3 further positioned between the amplifying unit 50 and the stabilizer 60. The third switching unit SW3 is configured to be switched by the PWM dimming signal.

The operation of the backlight unit of FIG. 6 further having the third switching unit SW3 includes those of the backlight units shown in FIGS. 1 and 5. Thus, the description of the operation of the backlight unit of FIG. 6 will be omitted.

Comparing with the embodiments of FIGS. 1 and 5, in the embodiment of FIG. 6, a momentary drop of the driving voltage Vled at the rising edge of the PWM dimming signal may be more prevented and a momentary rise of the driving voltage Vled at the falling edge of the PWM dimming signal may be more prevented. Also, the backlight unit may prevent a ripple of the driving voltage Vled at the rising of the PWM dimming signal, enabling to make stable maintenance of the LED driving current.

As has been described, the backlight unit, and the method for driving the same of the present invention have the following advantage.

According to the embodiment of the backlight unit of the present invention, the delay of forwarding of the switching signal is prevented at the time point the dimming signal rises from the low state to the high state, resulting to maintain the driving voltage Vled constant, enabling to maintain the LED driving current stable. It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A backlight unit, comprising:
an LED array having a plurality of LEDs;
a voltage generating unit for generating a driving voltage to drive the plurality of LEDs in response to a switching signal;
an amplifying unit for feeding the driving voltage back and amplifying the fed back driving voltage, to output an amplification signal;
a stabilizer for stabilizing the amplification signal;
a comparator for comparing the amplification signal with a reference waveform to apply the switching signal to the voltage generating unit;
a first switching unit for switching a current of the LED array in response to a PWM dimming signal from a timing controller; and
a second switching unit for switching the switching signal from the comparator in response to the PWM dimming signal,
wherein the amplifying unit distributes the driving voltage according to a resistance ratio of a first resistor and a second resistor of the amplifying unit to amplify the fed back driving voltage supplied to a differential amplifier of the amplifying unit.

2. The backlight unit as claimed in claim 1, further comprising a third switching unit for switching between the amplifying unit and the stabilizer in response to the PWM dimming signal.

3. The backlight unit as claimed in claim 2, wherein the first to third switching units are turned on in a high period of the PWM dimming signal, and are turned off in a low period of the PWM dimming signal.

4. The backlight unit as claimed in claim 1, wherein the reference waveform has a triangular waveform.

5. An apparatus comprising:
a voltage generator that outputs a driving voltage for a backlight assembly;
a comparator that outputs a switching signal to the voltage generator based on a comparison between an amplification signal and a reference signal; and
a switch that controls the comparator and operates according to a pulse width modulation (PWM) dimming signal used for switching a current of the backlight assembly, such that the switching signal output from the comparator is synchronized with the PWM dimming signal by controlling an output start of the switching signal to match a rising edge of the PWM dimming signal.

6. The apparatus of claim 5, wherein the switch synchronizes the switching signal output from the comparator with the PWM dimming signal by controlling an output end of the switching signal to match a falling edge of the PWM dimming signal, resulting in maintained voltage stability of the driving voltage for the backlight assembly.

7. The apparatus of claim 6, wherein the amplification signal is received from an amplification unit connected between an output of the voltage generator and an input of the comparator.

8. A method for driving a backlight unit, the method comprising:
generating a driving voltage to drive an LED array in response to a switching signal;
distributing and feeding the driving voltage back, and amplifying the fed back driving voltage to generate an amplification signal;
stabilizing the amplification signal;
controlling a current of the LED array in response to a PWM dimming signal;
comparing the amplification signal with a reference waveform to generate the switching signal; and
switching the switching signal in response to the PWM dimming signal,
wherein the distributing the driving voltage corresponds to a resistance ratio of a first resistor and a second resistor of the amplifying unit to amplify the fed back driving voltage supplied to a differential amplifier of the amplifying unit.

9. The method as claimed in claim 8, further comprising switching the amplification signal not to stabilize the amplification signal, in response to the PWM dimming signal.

10. The method as claimed in claim 9, wherein the switching signal is used in generating the driving voltage and the amplification signal is stabilized in a high period of the PWM dimming signal, and the switching signal is not used in generating the driving voltage and the amplification signal is not stabilized in a low period of the PWM dimming signal.

11. The method as claimed in claim 8, wherein the reference waveform has a triangular waveform.

12. The backlight unit as claimed in claim 3, wherein the voltage generating unit that consists of an inductor, a switching device, a diode, and a capacitor generates the driving voltage by resonance of the inductor, the diode, and the capacitor, and
wherein the switching device is switched in response to a duty cycle of the switching signal output from the comparator, to transform an input voltage into the driving voltage having a constant level, and to supply the driving voltage to the LEDs.

13. The backlight unit as claimed in claim 12, wherein the differential amplifier amplifies a difference between the fed back driving voltage input into an inversion input terminal of the differential amplifier and a reference voltage input into a non-inversion input terminal of the differential amplifier, and outputs the amplification signal.

14. The backlight unit as claimed in claim 13, wherein the comparator compares the amplification signal input into a non-inversion input terminal of the comparator with the reference waveform input into an inversion input terminal of the comparator to generate the switching signal.

15. The backlight unit as claimed in claim 14, wherein the switching signal output from the comparator is a PWM signal having a predetermined duty value and varies with a comparing operation of the comparator.

16. The backlight unit as claimed in claim 15, wherein when the amplification signal output from the differential amplifier has a potential higher than that of the reference waveform, the comparator outputs the switching signal having a high level,
wherein when the amplification signal output from the differential amplifier has a potential lower than the reference waveform, the comparator outputs the switching signal having a low level,
wherein when the amplification signal output from the differential amplifier has a potential higher than that of the reference waveform for an increasing amount of time, the duty cycle of the switching signal increases, and
wherein when the amplification signal output from the differential amplifier has a potential higher than that of the reference waveform for a decreasing amount of time, the duty cycle of the switching signal decreases.

17. The method as claimed in claim 8, wherein comparing the amplification signal with a reference waveform includes:
when the amplification signal output from the differential amplifier has a potential higher than that of the reference waveform, outputting the switching signal having a high level;
when the amplification signal output from the differential amplifier has a potential lower than the reference waveform, outputting the switching signal having a low level;
when the amplification signal output from the differential amplifier has a potential higher than that of the reference waveform for an increasing amount of time, increasing a duty cycle of the switching signal; and
when the amplification signal output from the differential amplifier has a potential higher than that of the reference waveform for a decreasing amount of time, decreasing the duty cycle of the switching signal.

18. The backlight unit as claimed in claim 1, wherein the second switching unit is connected between the stabilizer and a node between an output of the amplifying unit and an input of the comparator.

19. The backlight unit as claimed in claim 2, wherein the third switching unit is connected between the stabilizer and a node between an output of the amplifying unit and an input of the comparator, and
wherein the second switching unit is connected to the output of the comparator.

20. The apparatus of claim 7, wherein the switch is connected between a stabilizer and a node between an output of the amplification unit and an input of the comparator.

* * * * *